3,608,214
TEACHING AID AND METHOD
Patricia M. Rancati, 3304 Rumson Road,
Cleveland Heights, Ohio 44118
Filed July 11, 1969, Ser. No. 840,965
Int. Cl. G09b 19/12
U.S. Cl. 35—39                  5 Claims

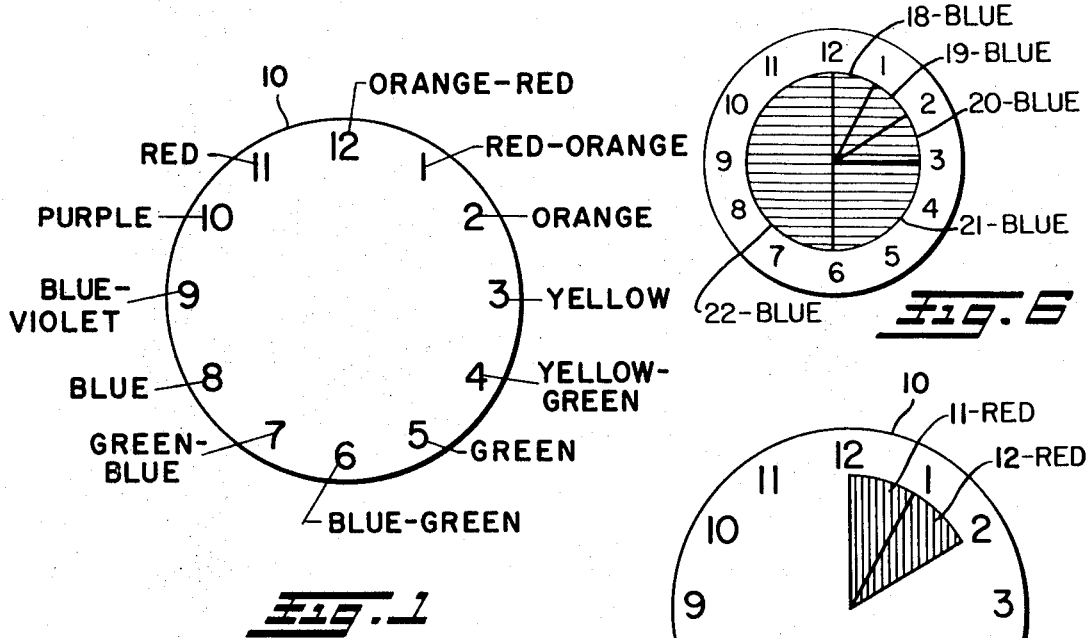
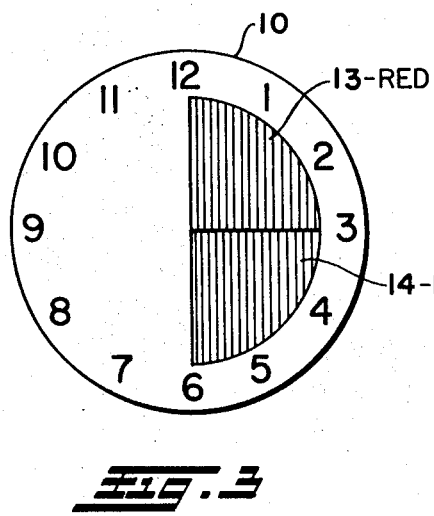
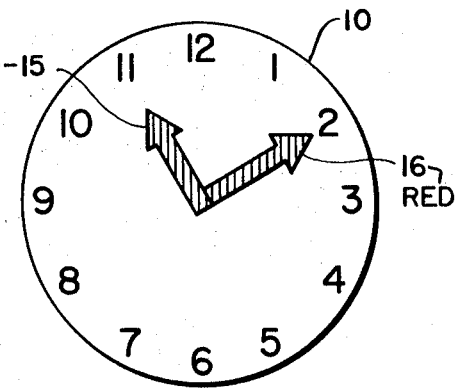
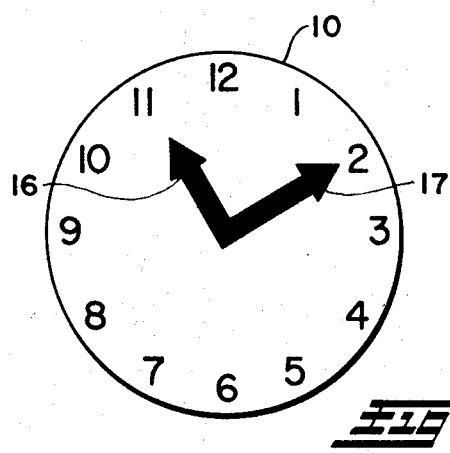
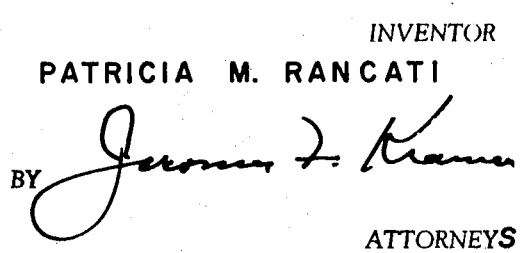
INVENTOR
PATRICIA M. RANCATI
BY
ATTORNEYS

United States Patent Office 3,608,214
Patented Sept. 28, 1971

ABSTRACT OF THE DISCLOSURE

This invention relates to a device and method for teaching the reading of time. It includes a disc having indicia circumferentially spaced about the periphery of one face to designate increments of time. The indicia differ from each other by shape and in a selected manner other than shape and such that the differences can be independently sensed by the human senses of sight and touch. There is also provided a plurality of sets of indicators each shaped as a sector of the disc face with each set differing from the other sets in the same manner as the indicia differ from each other, whereby the sets of indicators each relate to a different indicia on the disc face respectively. Initially, the passage of time is indicated by successively applying the sector indicators of a selected set to the clock face between successive indicia; the sector set corresponding to a selected one of the indicia for identification by at least one feature selected from the group consisting of color and texture. Thereafter, the sectored indicator sets are replaced by corresponding sets of pairs of linear indicators, viz, corresponding to the same color and/or texture of the sectorial indicators and selected indicia; the pair of a selected set being selectively positioned about the disc face to indicate the passage of time. Finally, the disc is replaced by a disc having indicia that do not differ from each other in the selected manner and a pair of linear indicators are selectively positioned about the face of the disc to indicate the passage of time; the latter arrangement corresponding to a standard clock face.

---

In attempting to teach persons, and particularly children, to read time, it has been found that it is difficult to convey comprehension of the passage of increments of time, as for example, increments after or before the hour on a standard clock face. Various modes and techniques have been employed in an effort to enhance such comprehension. However, most of such modes and techniques involve identification and recognition of the normal indicia on a standard clock face which does not inherently indicate the passage of time and, therefore, detracts from the required comprehension of the passage of time.

Accordingly, it is a principal object of this invention to convey the concept of passage of time in relation to the increments of time designated by the numeral indicia on a standard clock face.

It is a further object of this inventon to relate the comprehension of the passage of time between certain indicators and the numeral indicia on a standard clock face.

Briefly, in accordance with this invention, there is provided a device and method embodying a clock face wherein the numeral indicia differ from each other in a manner other than shape, and wherein there is provided a plurality of sets of indicators with each set of indicators differing from the other sets in the same manner as the indicia differ from each other. Thus, the sets of indicators each relate to a different indicia on the clock face respectively by color and/or texture. Initially, the passage of time is indicated by selectively applying a given set of indicators preferably shaped as sectors of the clock face successively to the clock face between successive indicia; the sectors corresponding to a given one of the indicia or numerals on the clock face. In this manner, the student is taught to recognize and comprehend the passage of time before and after a given hour in selected increments, as in five-minute or quarter-hour intervals. Having thus conveyed the incremental passage of time past or before a selected hour, the sectored indicators are then replaced by linear indicators of significantly less area corresponding to the hands of the clock and each relating again to a selected hour. After the transition from conveying the passage of time from sectored indicators to linear indicators, the indicia and linear indicators are replaced by numerals and hands respectively similar to those on a standard clock face, i.e., there is no color differentiation between successive indicia nor between the indicators. Preferably, the latter are exhibited on a separate disc so that the new disc may be used transitionally with the disc having the color differentiated indicia and indicators.

In the drawings:

FIG. 1 is a plan view of a clock face showing numerical indicia disposed at regular spaced intervals about the periphery;

FIG. 2 is a plan view of the clock face of FIG. 1 showing sectored indicators applied between selected successive numerical indicia;

FIG. 3 is a plan view of the clock face of FIG. 1 showing larger sectored indicators applied between selected successive indicia;

FIG. 4 is a plan view of the clock face of FIG. 1 showing linear indicators applied at different selected indicia respectively; and FIG. 5 is a plan view of a standard clock face showing numerical indicia and hand indicators which differ from each other only in shape and size, and FIG. 6 is a plan view of the clock face of FIG. 1 showing sectored indicators of various sizes applied to cover the entire clock face.

Referring more particularly now to FIG. 1 of the drawings, there is shown a circular disc 10 having a plurality of numerical indicia disposed in spaced circumferential relation about the periphery of the disc at five-minute intervals. In the preferred embodiment, each numerical indicia differs from every other numerical indicia by color as designated in FIG. 1 Actually, for young children it may be desirable to increase the color differences between successive indicia, but the designations in FIG. 1 may be referred to as exemplary. Other modes of distinction may be employed as, for example, the indicia may differ from each other in terms of texture or in any other manner wherein the differences can be sensed by the human senses. For example indicia having different textures from one another can be employed for each time segment (hour).

Referring now to FIG. 2 of the drawings, the clock face 10 with the differently colored numerical indicia of FIG. 1 is shown with two sectored indicators 11 and 12 disposed in side-by-side relation between the numerical indicia as 12–1 and 1–2. This disposition of the sectored indicators is intended to convey the passage of 10 minutes past the hour. The color of the sectored indicators will correspond to the selected hour involved. Thus, by way of example, if the sectored indicators are red, the configuration displayed in FIG. 2 would convey the passage of time 10 minutes past the "red" hour, i.e., the 11th hour. Successive applications of sectors of the same color will convey the increasing passage of time past or before the hour; in the latter case, sectors placed on the clock face past the numeral 6 convey either the passage of time past the hour or the interval of time remaining before the next hour. Thus, there is in the preferred embodiment a visual representation of the passage of time (by extent of sectorial area) related by color directly to a selected numerical indicia on the clock face. As shown in FIG. 3, the sectors can be varied in size to demonstrate the passage of increasing increments of time as, for example, quarter and half hours. FIG. 6 shows blue sectors varying in size from increments of five minutes (18, 19 and 20), to one-quarter hour (21), and to one-half hour (22) covering the entire face of disc 10 and thereby indicating the passage of an entire hour from 8 to 9 o'clock.

In the preferred embodiment, some means should be provided to permit releasable adhesion between the indicators and the clock face. It has been found, for example, that sufficient adhesion can be provided by making both the clock face and the indicators of felt or similar material.

Once the student has comprehended the passage of time conveyed by sectored indicators as applied to the clock face as hereinbefore described, and in accordance with the preferred embodiment of this invention, the colored sectored indicators may be replaced by linear indicators 15 and 16 in the form of arrows or the like as best shown in FIG. 4 of the drawings. The latter indicators are still related, as by the same color, to the selected hour. The student may be alternately exposed to either the sectored indicators as in FIG. 2 or to the linear indicators as in FIG. 4 until full comprehension develops concerning the passage of time in relation to the numerical indicia on the clock face.

Once comprehension of the passage of time has developed, the color or texture coded numerical indicia and indicators of FIGS. 1–4 can be replaced by a standard clock face wherein the numerical indicia and indicators are of the same color, as shown in FIG. 5 of the drawings. It has been found that with the aid of such visual relationship between color coded numerals and indicators on a clock face the teaching of time to a student, such as a young child, and the comprehension of the passage of time in relationship to a clock face can be accomplished in a more interesting and exciting manner. As hereinbefore noted, the relationship between the indicators and the numerals on the clock face may be other than by color, i.e., visual means, as for example, they may be related in terms of texture. In the latter case, it would be possible to employ this device and method to teach the reading of time to blind persons.

I have shown and described what I consider to be the preferred embodiment of my invention along with suggestions of modified forms, and it will be obvious to those skilled in the art that other changes and modifications can be made without departing from the scope of my invention as defined by the appended claims.

I claim:

1. A device for teaching reading and passage of time comprising,
   (a) a circular disc
   (b) indicia disposed on one face of the disc and circumferentially spaced about its periphery to represent segments of time corresponding to the face of a clock, each of said indicia differing from the others by shape and at least one distinguishing feature selected from the group consisting of color and texture and thereby capable of separate identification by at least one of the human senses,
   (c) a plurality of sets of sectorial indicators for said disc face, each set differing from the other sets in the same manner as the indicia differ from each other, and corresponding to each of said indicia by having in common therewith said feature with each set adapted to be selectively applied to said one face of the disc and thereby illustrate passage of time by sectorial areas and same common feature, each set including a plurality of sectors, the size and number of said sectors in each set being such to be capable of covering a fraction of said disc face to the entire disc face, the fraction covered representing a fraction of an hour, whereby time is indicated, the hour being indicated by the indicia which corresponds to the common feature of the set applied to the face, and the minutes being indicated by the fraction of the disc face covered by the sectors.

2. The device of claim 1 wherein the indicia and the sectorial indicator sets each respectively differ from each other in terms of color.

3. The device of claim 1 wherein the indicia and the sectorial indicator sets each respectively differ from each other in terms of texture.

4. The device of claim 1 wherein said indicators are releasably applied to the disc face and include means for adhesively coacting therebetween.

5. The device of claim 1 which includes pairs of linear indicators adapted to be applied to the disc face, each pair of linear indicators having said feature in common with each indicia.

References Cited

UNITED STATES PATENTS

| | | | |
|---|---|---|---|
| D. 186,071 | 9/1959 | Golden | 35—39UX |
| 2,586,039 | 2/1952 | Heggedal | 35—39UX |
| 2,853,804 | 9/1958 | Bengeyfield | 35—39 |
| 2,994,970 | 8/1961 | Spooner | 35—39 |
| 2,997,794 | 8/1961 | Burr | 35—39 |
| 3,022,582 | 2/1962 | Pitt | 35—39 |
| 3,034,229 | 5/1962 | Kessler | 35—39 |

FOREIGN PATENTS

| | | |
|---|---|---|
| 580,471 | 9/1946 | Great Britain. |
| 599,038 | 3/1948 | Great Britain. |
| 1,194,007 | 5/1959 | France. |

JEROME SCHNALL, Primary Examiner